United States Patent [19]

Wilson et al.

[11] 3,945,256

[45] Mar. 23, 1976

[54] HELICOPTER ROTOR BALANCING APPARATUS AND METHOD

[75] Inventors: William F. Wilson, Bedford, Tex.; James R. Chadwick, Bradbury; James G. Helmuth, Monrovia, both of Calif.

[73] Assignee: Chadwick-Helmuth Company, Inc., Monrovia, Calif.

[22] Filed: Apr. 21, 1975

[21] Appl. No.: 570,225

[52] U.S. Cl. .................................................. 73/455
[51] Int. Cl.² ...................... G01M 1/22; G01M 1/28
[58] Field of Search ............................ 73/455, 147

[56] References Cited
UNITED STATES PATENTS

| | | | |
|---|---|---|---|
| 2,343,383 | 3/1944 | Martin et al. | 73/455 |
| 3,802,273 | 4/1974 | Helmuth et al. | 73/455 |

Primary Examiner—James J. Gill
Attorney, Agent, or Firm—William W. Haefliger

[57] ABSTRACT

The method of balancing a rotor having multiple blades and defining an axis of rotation, and wherein structure proximate the rotor is subject to vibratory motion due to dynamic unbalance of the rotating rotor and an out-of-track condition of the rotor blades, the method employing two vibration pickups, the method including:

a. operating the pickups to produce vibratory signals corresponding to up and down vibratory motion of the structure at port and starboard sides of said axis, b. combining said signals to produce a resultant oscillatory output signal characteristic of rotor vibratory motion due substantially to only one of said conditions, c. using said resultant output signal to alleviate said one condition.

12 Claims, 14 Drawing Figures

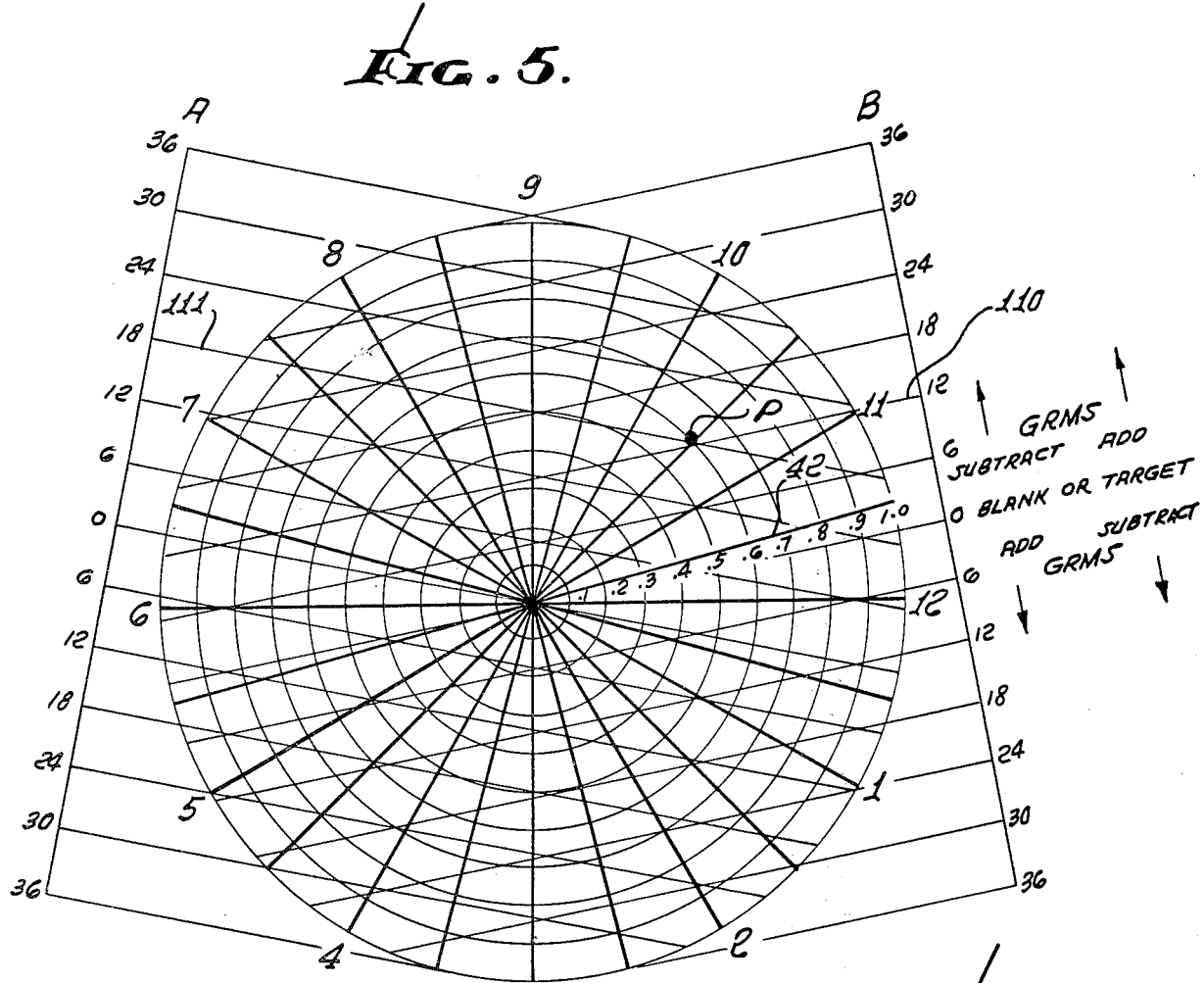
FIG. 5.
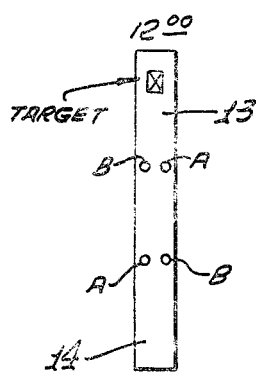
FIG. 6.
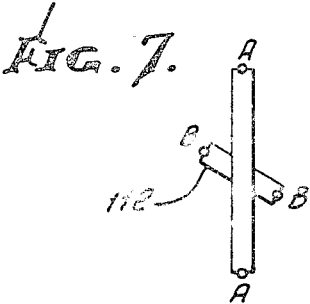
FIG. 7.
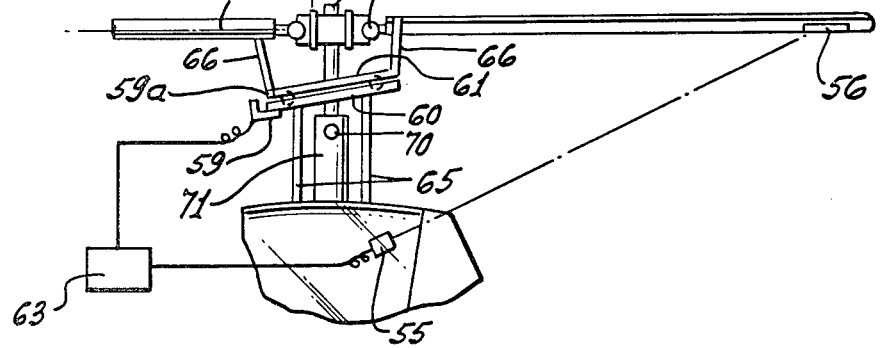
FIG. 8.
FIG. 9.

HELICOPTER ROTOR BALANCING APPARATUS AND METHOD

BACKGROUND OF THE INVENTION

This invention relates generally to dynamic balancing, on the helicopter, of rotors, and more particularly concerns method and apparatus for quickly and efficiently determining the amount of weight to be added to or subtracted from predetermined positions on the rotor.

It is a well known fact that a slight out of balance condition of a helicopter main rotor or tail rotor can cause roughness and vibration leading to premature wear and failure of the machine, and fatigue and annoyance of pilot and passengers. In the past, techniques used to correct out-of-balance in the field were crude, time consuming and inaccurate. For example, the mechanic would randomly add a weight to one of the several possible points of weight addition. The pilot and mechanic would hover the ship and try to judge whether the ship felt rougher or smoother; or the same. If rougher, the weight addition would be shifted to an opposite point; if then smoother, more weight would be tried (although it might really require less). If the same, another point would be tried. Generally, this would not lead to a smooth rotor, so weights would be added at another angular position, and the whole operation repeated. By repeating this procedure many times, vibration might be lessened, but the achievement of desired reduction was extremely unusual, because while the pilot could sense vibrational amplitude arising from rotor unbalance, he could not readily sense phase characteristics, and thus had not way of determining the locations for adding weights.

An important solution to the above problems, described in U.S. Pat. No. 3,802,273, concerns the provision of a helicopter main rotor and tail rotor dynamic balancing method on the ship, and apparatus characterized as enabling rapid and accurate balancing under field conditions. That method involves the attachment of an accelerometer to helicopter structure proximate the rotor (main or tail) subject to oscillatory motion induced by rotor dynamic unbalance; operating the accelerometer to produce an electrical signal which is processed to derive a corresponding amplified output signal; triggering a stroboscope in synchronism with cyclic variations in the output signal and directing the stroboscope at the rotor to produce flashes repeatedly illuminating a target rotor blade at a characteristic angularity with respect to its axis of rotation; and, varying the weighting of the rotor as a function of the magnitude of the output signal and the target blade characteristic angularity to achieve substantial balance. The varying step may include establishing a multi-coordinate system, either analog or digital, characterized in that a first coordinate scale delineates peak values of the output signal, a second coordinate scale delineates values of target blade angularity about its axis of rotation, and other coordinate scale means delineates weight values to be added or subtracted to at least one predetermined position on the rotor, and further characterized in that any point in the system defined by particular coordinates on the first and second scales in turn defines particular weighting (on the other scale means) to be added or subtracted. Such first and second scales may define a polar coordinate system, and the other scale means may include two linear scales respectively associated with two sets of symmetric positions on the rotor, where weights are to be added or subtracted.

The method described in that patent contemplates preliminarily adjusting the rotor blades to accurately track one another during rotary travel; however, such prior adjustment may not always be possible, in practice, and in such event it is sometimes found that main rotor dynamic unbalance is affected by an out-of-track condition to an extent making satisfactory dynamic balance difficult to achieve. Further, main rotor blade out-of-track and out-of-balance conditions affect one another, i.e. interact, during flight, so that mixed, resultant vibrations are produced which are difficult to isolate and eliminate.

SUMMARY OF THE INVENTION

It is a major object of the present invention to provide method and apparatus enabling in-flight isolation of main rotor out-of-balance vibrations from out-of-track vibrations, and vice versa, so that accurate tracking and counterbalancing may be achieved, under field conditions.

Basically, the method involves the employment of two vibration pickups in relation to helicopter structure near the main rotor and includes the steps of operating the pickups to produce vibration signals corresponding to up and down vibratory motion of the structure at port and starboard sides of that axis, combining the signals to produce a resultant oscillatory output signal characteristic of rotor vibratory motions due substantially to only one of the out-of-balance and out-of-track conditions; and using the resultant output signal to alleviate said one condition.

As will be seen, the signals may be combined by adding or subtracting them, or performing these combinations in sequence in order to permit alleviation of both out-of-balance and out-of-track conditions; and the pickups may be preliminarily attached to the structure at opposite sides (port and starboard) of the rotor axis, relative to the cabin.

It is another object of the invention to provide apparatus to perform the steps or functions referred to, and also to enable determination of blade angularity without directing a stroboscope at the main rotor, which is oftentimes difficult under actual flight conditions.

These and other objects and advantages of the invention, as well as the details of illustrative embodiments, will be more fully understood from the following description and drawings, in which:

DRAWING DESCRIPTION

FIG. 5 is a coordinate system graph;

FIG. 6 is another representation of the FIG. 1 tail rotor blade;

FIG. 7 is a representation of another tail rotor blade configuration;

FIG. 8 is a perspective showing of a hovering helicopter to which the invention is applicable;

FIG. 9 is an fragmentary elevation showing a helicopter main rotor head;

DETAILED DESCRIPTION

Figure 1:
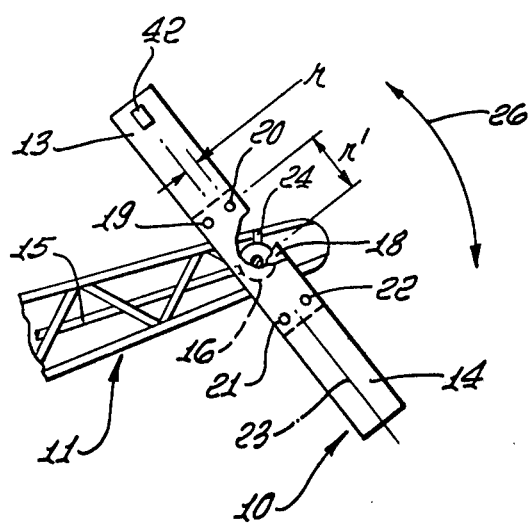
FIG. 1 is a side elevation of a helicopter tail rotor to be balanced.
Figure 2:
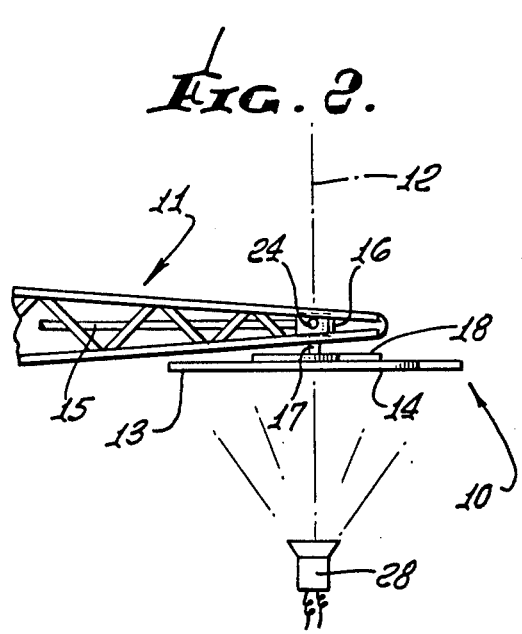
FIG. 2 is a top plan view of the FIG. 1 rotor.

In the drawings, a helicopter rotor may take the form of the tail rotor 10 in FIGS. 1 and 2 carried by helicopter boom structure 11, and defining an axis of rotation 12. The rotor 10 may typically have multiple like blades such as are indicated at 13 and 14 extending diametrically oppositely from axis 12. Power is transmitted to the rotor as for example by shaft 15, right angular gearing in gear box 16, and stub shaft 17 to which the blades are attached as via grips 18 by means of which the pitch of the blades may be changed. Suitable fastener locations are indicated at 19, 20, 21 and 22. Locations 19 and 22 are symmetrically located at opposite sides of axis 12, and locations 20 and 21 are symmetrically located at opposite sides of axis 12. Also, locations 19 and 20 are at opposite sides of blade axis 23, as are locations 21 and 22, and axis 23 extends normal to axis 12. It should be noted that the exact mechanical detail of blade attachment, pitch change means, etc. varies greatly from helicopter type-to-type, as do the number of blades. These mechanical considerations dictate the possible locations for weight addition.

As described in U.S. Pat. No. 3,802,273, a vibration pickup such as an accelerometer is attached to the helicopter structure proximate the rotor; and, in the example described an accelerometer 24 is shown attached to gear box 16. The instrument is operated to produce an output acceleration signal which is a function of oscillatory motion of the helicopter structure, as for example the boom structure 11, and which arises due to dynamic unbalance of the rotating rotor. Thus, the boom structure may undesirably vibrate in one or more directions, it being a prime purpose of the invention to significantly reduce or eliminate such vibration. Depending on structure, the vibration (motion) may be elliptical, or even circular. While the accelerometer is shown as attached to the gear box, it will be understood that it may be attached to other structure, so long as such structure is subject to rotor unbalance induced oscillatory motion which is to be reduced or eliminated. While an accelerometer has been referred to any transducer producing a cyclic output signal in response to structure vibrations may be used.

The vibration pickup output is typically an electrical signal varying in accordance with the vibration, and therefore constitutes an output signal. That signal is typically processed to produce a corresponding output signal to be used to operate a meter or other device to indicate amplitude, and to display phase and for triggering a stroboscope shown at 28 in FIGS. 2 and 3. For that purpose processing circuitry may be electrically connected between the accelerometer or pickup 24 and the stroboscope, and may advantageously include a band pass filter 29 and a trigger 35, these individually being well known components. The filter 29 has the dual functions of passing the accelerometer signal corresponding to the structure oscillation frequency to be reduced or eliminated (usually the fundamental), while rejecting other signals corresponding to other excitation frequencies, and also integrating the selected or passed signal to thereby produce an output velocity signal on lead 32. Filter 29 may be manually tuned, as by rotating knob 33, to select the frequency of the structure vibration to be reduced or eliminated; further, the filter may be "stagger tuned" to provide a rather broad range of pass frequencies as indicated between the limits $f_1$ and $f_2$ of response curve 36 in FIG. 4 rather than a narrow range of pass frequencies as indicated by the response curve 37 in that figure. A meter 39 in FIG. 3 indicates accelerometer velocity, as for example in inches per second, which may represent the maximum velocity of the boom structure as it vibrates back and forth. In this regard, and as will be seen, an important advantage in converting the maximum accelerometer output to a maximum velocity signal (rather than acceleration or displacement) lies in the fact that whereas displacement and acceleration outputs for acceptable vibration levels vary widely (as a function of rate or frequency and as for example between helicopter main rotor and tail rotor applications), velocity outputs for acceptable vibrations vary much less widely, and use of the latter for balancing purposes enables use of the same instrumentation, without "range changing," for all such applications.

The stagger tuned vs single tuned filter characteristic is used to verify tuning, for when the "verify tune" button is depressed, the filter converts from its stagger-tuned characteristic to single tuned. If the rate is not set in exact coincidence with the rotor rate, the amplitude and/or observed phase will change. Tuning is adjusted as required (front panel control) until there is no change when the button is pushed.

Trigger circuit 35 operates in response to occurrence of positive going zero crossing of the velocity signal on lead 32, for cyclically triggering the stroboscope 28 to which the trigger circuit is connected as via lead 40. An example of a known usable stroboscope STROBEX is Model 135M-9 or 135M-10, a product of Chadwick-Helmuth Co., Monrovia, Cal. The stroboscope is directed at the rotor, as in FIG. 2 for example, to produce flashes repeatedly illuminating a target blade (13 for example bearing target reflector 42) which appears relatively stationary at a "characteristic angularity" with respect to axis 12. This characteristic angularity is determined by the complex spring (of the supporting airframe) mass (of the rotor) system and the rotor rate. Each rotor of each helicopter type has a characteristic phase (or angularity) relation. Knowing such angularity, which may be expressed as "clock" position (blade 13 being shown at a 10:30 clock position in FIG. 1) and the magnitude of the maximum output velocity signal as it appears on meter 39, one may vary the weighting of the rotor to achieve substantial balance. In this regard, a small weight or weights may be added to or subtracted from the rotor at any of the fastener locations 19–22, the amount of such weighting change and the particular fastener locations at which the change is to be effected being determined by the reading on meter 39 and the clock position of the stroboscopically illuminated target blade. Accordingly, costly and time consuming trial and error weight change procedures are eliminated. Such weights may consist of washers to be added to or removed from threaded fasteners.

The determination of location and amount of rotor weighting may advantageously include the step of establishing a multi-coordinate system characterized in that:

a. a first coordinate scale delineates values of the velocity signal, b. a second coordinate scale delineates values of blade angularity (clock position) about its axis of rotation; and c. other coordinate scale means delineates weight values to be added or subtracted at at least one position on the rotor, and further characterized in that any point in the system or field defined by associated blade angle and velocity value coordinates in turn defines particular weighting to be added or subtracted at a position or positions on the rotor.

The referenced multi-coordinate system may be established in analog form (as for example graphic), tabular form, or in digital form (as for example in a digital computer memory). Thus, in FIG. 5 for example, a polar (analog) coordinate system is shown or established, with concentric circles delineating inches per second velocity values (0.1 to 1.0), and "clock" angles or positions (1 to 12) from a selected radius 42 delineate values of stroboscopically stopped target blade angularity. The referred to other coordinate scale means delineating weight values takes the form, in FIG. 5, of two linear auxiliary scales represented as A and B, and respectively corresponding to or associated with predetermined A and B weight adding or subtracting positions on the rotor blades 13 and 14 seen in FIG. 6.

Thus, for any point in the coordinate system defined by particular blade angle and velocity value coordinates, there is associated or defined particular weighting to be added or subtracted at the referenced position or positions on the rotor. For example point "P" representing a stroboscopically stopped blade angle or clock position 10:30 and velocity value 0.6 inches per second on meter 39 in turn defines (via intercept line 110) a 12 gram weight to be added to the target blade 13 at the B position shown in FIG. 6 (or alternatively a 12 gram weight to be subtracted from the blank blade 14 at the symmetrical B position shown), and also an 18 gram weight (via intercept line 111) to be subtracted from the target blade 13 and A position shown in FIG. 6 (or alternatively an 18 gram weight to be subtracted from the blank blade 14 at the symmetrical A position as shown). FIG. 7 illustrates another tail rotor configuration, with A positions at the blade tips, and B positions at the tips of a blade pitch control link 112 which rotates with the tail rotor, the chart for this configuration not being shown. In this regard, it should be noted that each rotor has certain locations, which will always be the same for that rotor type, at which weights may be added. The charts "reflect" the geometry of those possible points where weight may be added in relation to the rotor. Thus each rotor of each type of ship must have its own chart.

Using the above method, the helicopter tail rotor may be rapidly and accurately balanced with minimum cost and delay.

FIG. 8 illustrates balancing of a helicopter main rotor 50. Initially, the main rotor blades 51-54 are tracked to make sure that, as they rotate and pass through any given point in the azimuth, they are at the same level. Out-of-track condition causes roughness and vibration, affecting the balancing of the rotor unless removed prior to such balancing. Vibration and roughness arising from out-of-track conditions causes vertical and lateral vibration which masks the out-of-balance induced lateral vibration, making it impossible to distinguish the desired signal.

The condition of blade track is first observed with the ship operating as it will be during balancing, i.e. on the ground, or during hovering, as by aiming a stroboscopically operated light source 55 at the rotating blade tip path, the blade tip undersides carrying like retroreflective targets 56. The latter reflect light from the beam 57 back toward the observer 58 inside the helicopter, who sees the bright targets in the sky. The blades are typically identified by target shape or color and any misaligned blade can be identified and the degree of misalignment judged. Thereafter, after the helicopter is at rest on the ground, the offending blade can be trim-adjusted back into alignment, as by means commonly provided at the rotor head 58'.

The light source 55 may comprise, for example, a STROBEX Model 135 M-9 or M-10 product of Chadwick-Helmuth Co., Inc., Monrovia, Cal. Its sync signal may be derived from a magnetic pick-up 59 secured to a fixed swashplate 60 (better seen in FIG. 9), the pick-up projecting near a swashplate 61 rotated by main drive shaft 62. Swashplate 61 carries a number of components (one for each blade) such as soft iron elements 59a, which magnetically actuate the pick-up to produce the sync signal, once for each blade passage. The sync signal is used to control the stroboscopic lamp 55. Tilt controls for the fixed swashplate are shown at 65 and operated to control pivoting of the rotating blades via pitch control links 66, to provide flight direction control of the helicopter as well as lift control.

As described in U.S. Pat. No. 3,802,263, dynamic balance of the main rotor may then be attained in a manner similar to that described above for the tail rotor. As shown in FIG. 9, an accelerometer 70 is attached to and near the top of the non-rotating mast 71 through which the main rotor drive shaft 62 passes, to detect lateral vibration of the mast arising from rotor dynamic unbalance. The accelerometer may be attached at a 9:00 o'clock position about the mast, 12:00 o'clock being forward. The accelerometer output is processed as in FIG. 3 to operate the stroboscope 28 which may be directed at the rotating rotor from the pilot's compartment in a manner similar to directing of stroboscope 55 in FIG. 8. The observed azimuth position at which the target is seen may jitter or be somewhat uncertain so it is advantageous to place the reflective target close to the blade roots, or on the hub. The target blade when illuminated may be located at any position about rotor main drive axis 73 depending upon the location of the imbalance.

Figure 11:
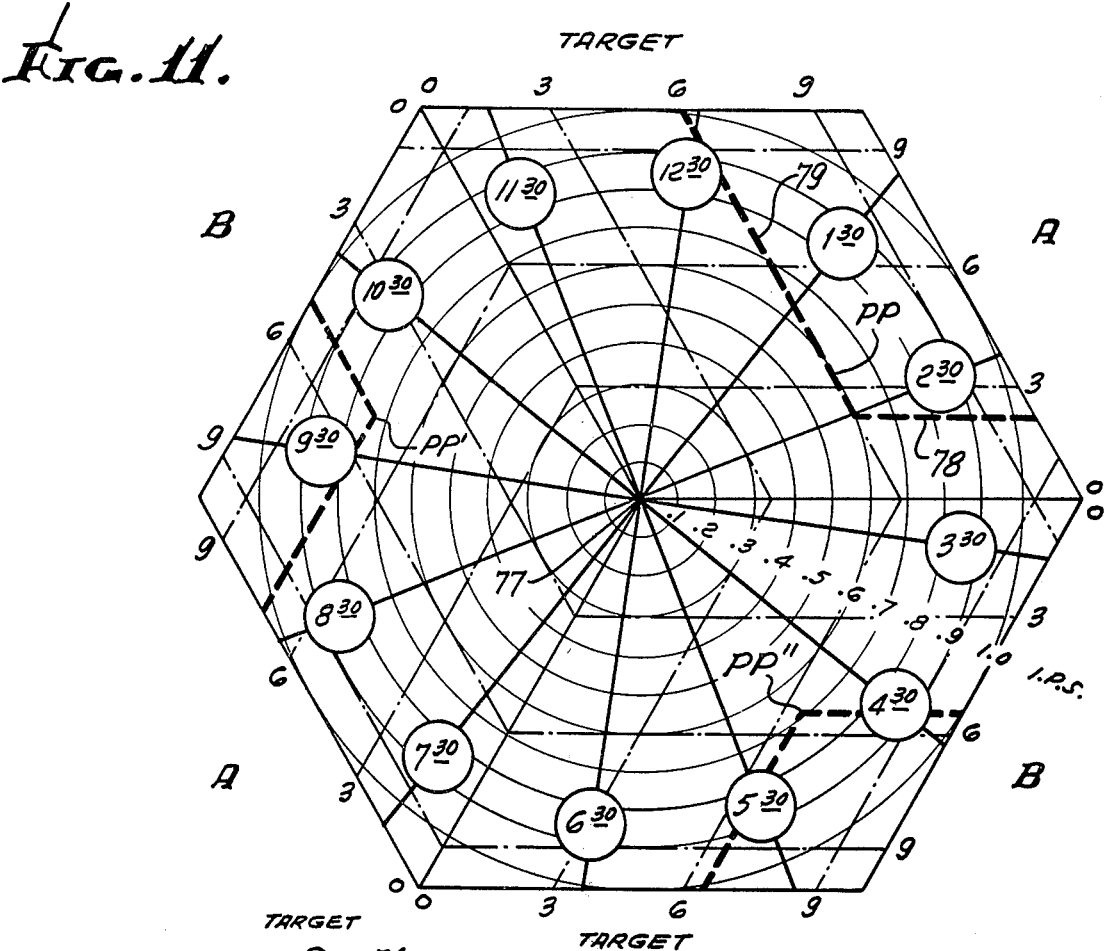
FIG. 11 is another coordinate system graph.
Figure 10:
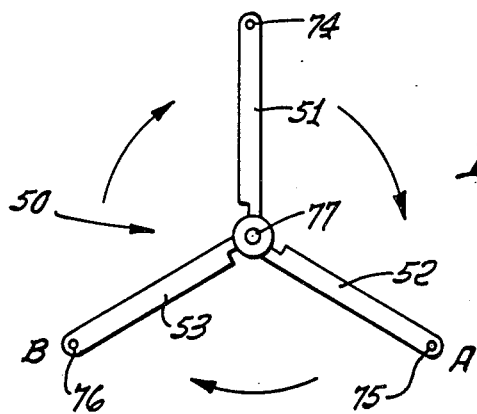
FIG. 10 is a plan view of a main rotor.

Assuming a main rotor 50 having three blades indicated as TARGET, A and B in FIG. 10, the latter may have fixed weight addition or subtraction positions indicated at 74-76. The determination of the amount of weight to be changed at any two of the three positions to overcome dynamic unbalance may be made with the aid of a multi-coordinate system as for example is shown in FIG. 11. As there seen, a first coordinate scale may be defined by concentric circles about center or pole 77, and identified by the i.p.s. (inches per second velocity output) number 0.1 to 1.0; and a second co-ordinate scale (delineating values of the angularity) is defined by the radial lines spaced apart at 30° intervals and identified by "clock positions" 12:30, 1:30—11:30. Other coordinate scale means delineating weight values to be added at at least two positions on the rotors are indicated at A, B and TARGET locations along hexagonal lines as shown.

In an example, assume a point PP representing a stroboscopically stopped target blade angle or clock position at 2:30, and also representing a velocity signal (derived from the accelerometer, as described) of about 0.6 inches per second. The two auxiliary scales applicable to this position are the A scale and TARGET scale at the top and top right of FIG. 11. As indicated, the corresponding intercept along line 78 on that A scale is approximately 2 weight values (grams, for example) to be added to the A blade at position 75, and the corresponding intercept along line 79 on that TARGET scale is approximately 5.8 weight values to be added to the TARGET blade at position 74, in FIG. 10. The intercept lines are parallel to the hexagonal scale lines A, B and TARGET in FIG. 11. Note that a point PP' would have intercepts on the A and B scales as shown, and that a point PP'' would have intercepts on the opposite TARGET and B scales, as shown. Also note that weights are to be added in every case, rather than subtracted.

Figure 3:
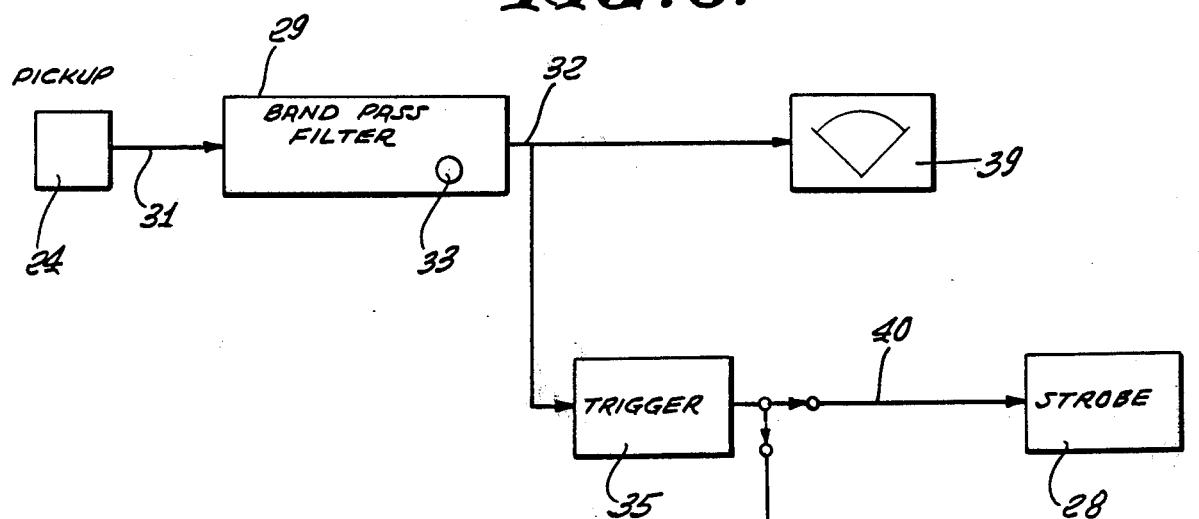
FIG. 3 is a block diagram of circuitry used in the balancing process.
Figure 4:
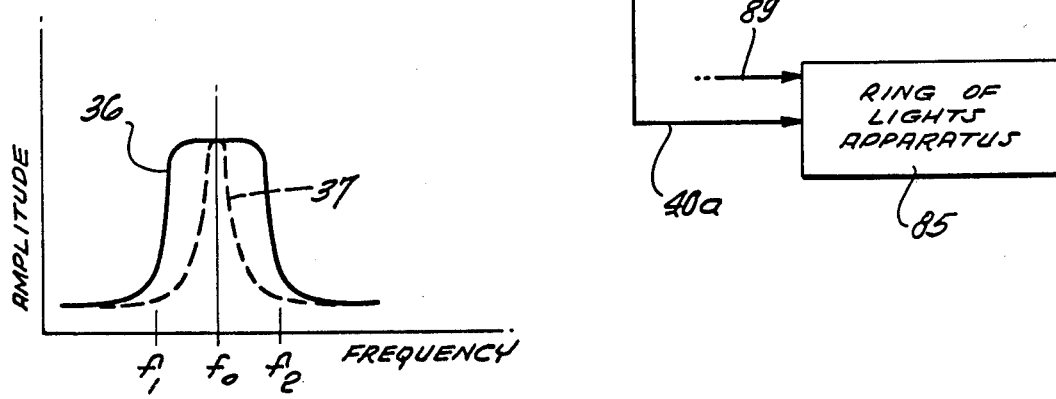
FIG. 4 is a frequency response diagram.
Figure 12:
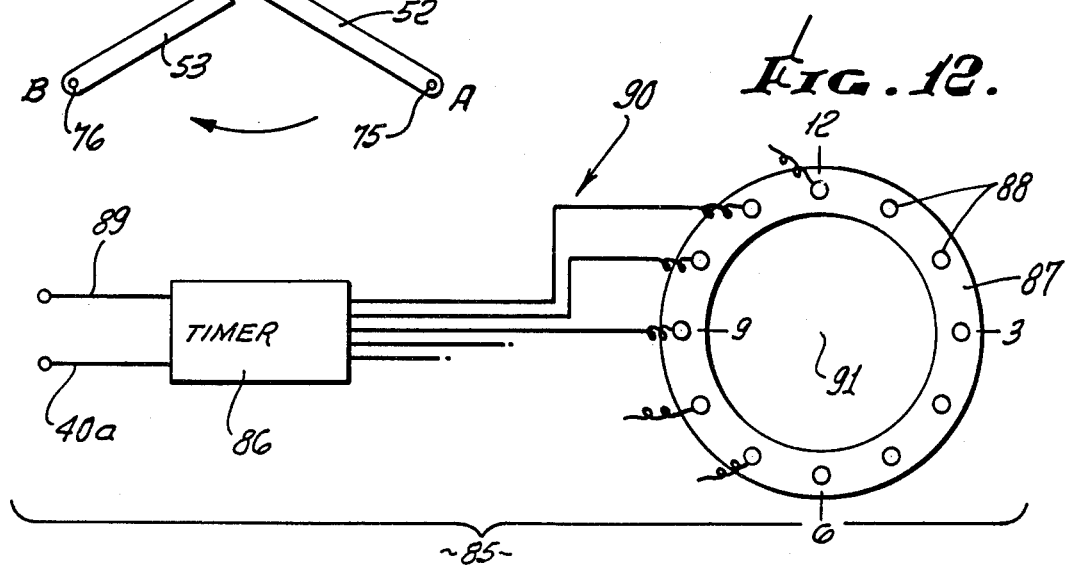
FIG. 12 is a light arrangement.

To obviate the difficulty of aiming the stroboscope 28 to the target blade in any position about axis 73, an auxiliary device 85 may be used as shown in FIG. 12. That device, such as Phazor Model 171, a product of Chadwick-Helmuth Co., Monrovia, Cal., may include a timer 86 and a ring 87 with lights or indicators 88 at equi-spaced angular intervals on the ring. The timer receives a sync signal once each revolution of the target blade 51, for example on line 89 to which the sync signal generator 59 may be connected. The timer is connected via leads 90 with all twelve (or other number) of lights 88 to turn them on in succession and in synchronism with the rotating clock position of the target blade; however, the timer also receives the trigger signal output on lead 40a as shown in FIG. 3. The timer only passes or gates an energizing signal to that light which is closest in synchronized position about axis 91 to the target blade position about axis 73 at the moment of trigger signal transmission. Accordingly, the operator may observe the angular clock position of the energized light or indicator, on the ring 87 in the pilot's compartment, and use the information as described above in the determination of blade weighting.

The compelling reason for the device 85 (the reason balance must be done in the air for some ships) is that the articulated (hinged) rotor systems have dampers (shock absorbers) in the lead-lag (azimuth) direction. Certain types of dampers have high static friction and don't allow the blade to adjust (by the effects of centrifugal force) to their desired equal spacing. If the ship is hovered, the necessary working of the controls, and loading of the blades "breaks" the static frictions and allows the blades to "phase" themselves properly. Thus balancing must be done from inside the ship where the device 85 is used.

The ship may be fitted with hardware to produce a sync signal for each blade passage to facilitate the blade tracking measurements. In this case, one of the sync signals (normally, the TARGET blade) is made a double pulse, and the device 85 includes logic to accept only the double pulse for the required one-per-rev. signal.

Because track and balance must be worked together, especially on main rotor, the instruments have been arranged to make this simple and quick to do. Tracking by the Strobex, as has been described, required one signal per blade from the magnetic pickup, but phase determination by the device 85 requires only one signal per revolution. Logic is incorporated in the device 85 that will response only to a "double pulse" with an interval of 0.5 to 5 millisecond, and will ignore all single pulses. The Stobex, however, has logic such that it responds only to the first pulse.

Thus by installing, on the rotating swashplate, one double interrupter with interval suitable to generate the appropriate double pulse, and the required number ($n-1$ for $n$ blades) of single interrupters the signals (pulses) suitable for both track and balance are generated.

By simple front-panel selection then, either track or balance may be accomplished at will, making the operation very quick and simple.

Referring back to FIG. 9, each blade typically may have three axes of rotation designated as the pitch axis 95 extending generally parallel to the blade length, the articulation axis 96 extending generally horizontally and normal to axis 95, and vertical axis 97, suitable joints being provided to facilitate blade rotation about such axes.

Figure 13:
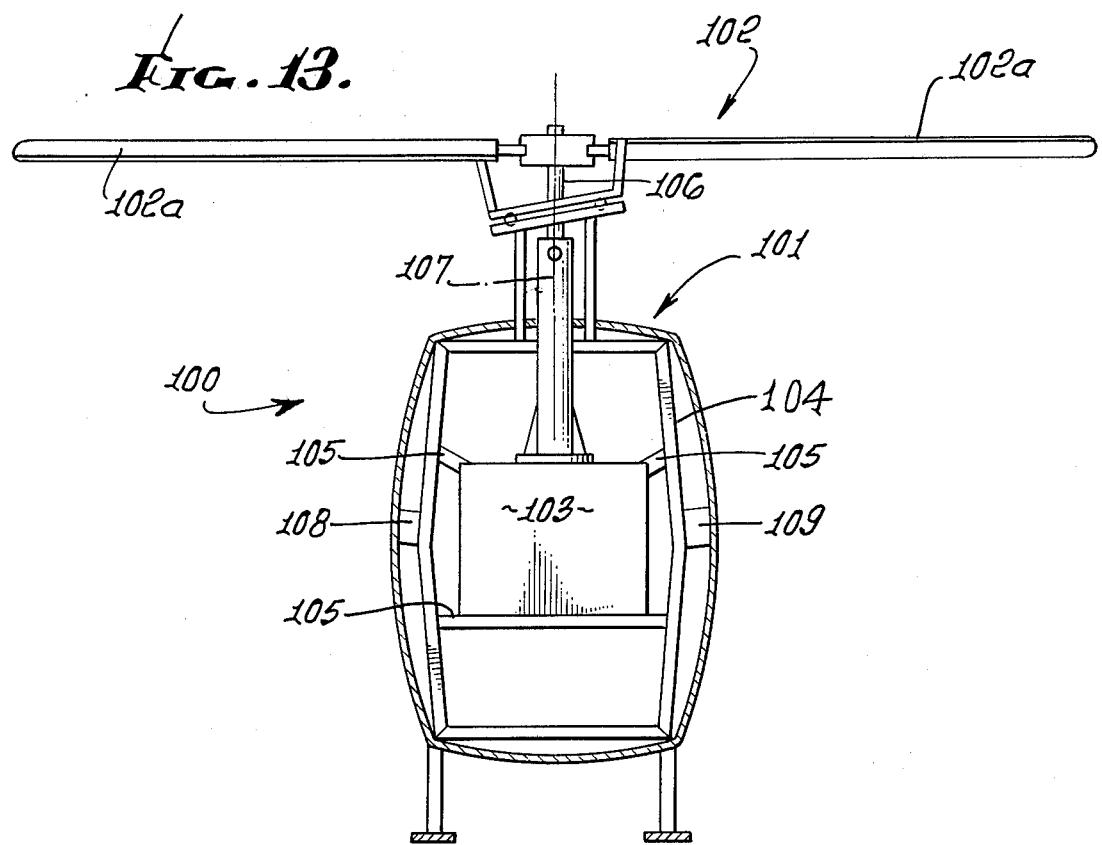
FIG. 13 is a vertical section through a helicopter proximate the main rotor, and looking forward.

Referring now to FIG. 13, the helicopter 100 includes a fuselage 101, a main rotor 102 having blades 102a, an engine 103 suitably connected with the fuselage framework 104 at locations 105, and an engine driven main drive shaft 106 for the rotor. The rotor axis appears at 107. In accordance with the invention, vibration pickups 108 and 109 are connected with the framework or structure 104 at generally opposite (port and starboard) sides of the upright axis 107, so as to sense up and down vibration at those locations. In the drawing, the pickups are located at opposite sides of the engine. Accordingly, the pickups produce vibratory signals corresponding to up and down vibratory motion of the structure at port and starboard sides of the axis 107, such motion being due to an out-of-balance condition of the rotor, an out-of-track condition of the rotor, or both of these.

Figure 14:
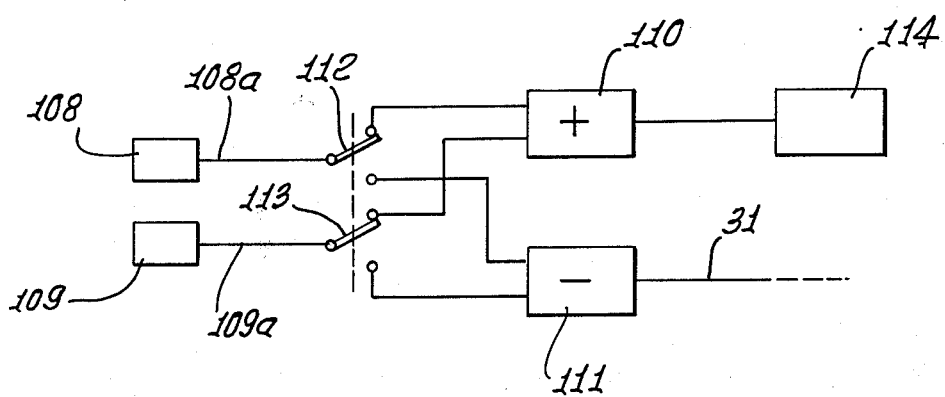
FIG. 14 is a block-form circuit diagram.

The output signals of the pickups, depicted at 108a and 109a in FIG. 14, are then combined to produce a resultant oscillatory output signal characteristic of rotor vibratory motion due substantially to only one of the two conditions referred to, and the resultant output signal is then used to alleviate that one condition. In the FIG. 14 example, the signals may be selectively combined as by adding them at 110 or subtracting them at 111. For this purpose, ganged switches 112 and 113 may be employed as shown, whereby in one position (as illustrated) the switches connect the output signals with the ADD device 110, and in the alternate position the switches connect the output signals 108a and 109a with the SUBTRACT device 111. Examples of the devices 110 and 111 are Model 177 M-7 Tracker Balancer, a product of Chadwick-Helmuth Electronics, Inc., Monrovia, Cal. The output of the device 111 is transmitted on lead 31 to the circuitry as seen in FIG. 3, and the output of device 110 on lead 113 is transmitted to analyzer 114 for use in correction for out-of-track. Analyzer 114 may be as embodied in the above mentioned Model 177 M-7 Tracker Balancer.

In operation of the two pickups, it is found that rotor out-of-track vibration causes both pickups to accelerate up and down together, whereas rotor out-of-balance vibration causes one pickup to accelerate relatively up while the other accelerates relatively down, and vice versa. Accordingly, when added together at 110, the out-of-balance components tend to offset or cancel while the out-of-track components reinforce; and conversely, when subtracted at 111, the out-of-balance components reinforce whereas the out-of-track components cancel or offset one another.

In the above procedure, a tracking chart, similar to the balance chart, may be employed to aid the determination as to which blade to raise or lower in response to a given "IPS" and clock reading.

We claim:

1. In the method of balancing a bladed rotor having multiple blades and defining an axis of rotation, and wherein structure proximate the rotor is subject to vibratory motion due to a dynamic unbalance condition of the rotating rotor and an out-of-track condition of the rotor blades, the method employing two vibration pickups, the method including
   a. operating the pickups to produce vibratory signals corresponding to up and down vibratory motion of the structure at port and starboard sides of said axis,
   b. combining said signals to produce a resultant oscillatory output signal characteristic of rotor vibratory motion due substantially to only one of said conditions,
   c. using said resultant output signal to alleviate said one condition.

2. The method of claim 1 including the step of subsequently combining said signals to produce another resultant oscillatory output signal characteristic of rotor vibrating motion due substantially to the other of said conditions, and using said other output signal to alleviate said other condition.

3. The method of claim 1 wherein said signals are combined by adding them.

4. The method of claim 1 wherein said signals are combined by subtracting them.

5. The method of claim 1 wherein said resultant signal is used to determine the characteristic angularity of one of said blades about said axis once each cycle of said signal, and the weighting of the rotor is then varied as a function of the magnitude of the signal and of said characteristic angularity.

6. The method of claim 5 wherein said weighting of the rotor is varied at a preselected angularly offset and radially fixed location.

7. The method of claim 1 which includes the step of first attaching the respective pickups to said structure at generally opposite sides of said axis.

8. In the method of balancing a bladed rotor having multiple blades and defining an axis of rotation, and wherein structure proximate the rotor is subject to vibratory motion due to a dynamic unbalance condition of the rotating rotor and an out-of-track condition of the rotor blades, the method employing two vibration pickups and a stroboscope, the method including
   a. attaching the pickups to said structure at generally opposite sides of said axis and operating the pickups to produce vibratory signals corresponding to the outputs of the respective pickups,
   b. combining said signals to produce a resultant oscillatory output signal characteristic of rotor vibratory motion due substantially to only said dynamic unbalance condition,
   c. triggering the stroboscope in synchronism with said resultant output signal and directing the stroboscope at the rotor to produce flashes repeatedly illuminating a target rotor blade at a characteristic angularity with respect to said axis, and
   d. varying the weighting of the rotor as a function of the magnitude of said signal and said characteristic angularity to achieve substantial balance.

9. In combination with a helicopter rotor having multiple blades and defining an upright axis of rotation and helicopter structure proximate the rotor subject to vibratory motion due to a dynamic unbalance conditions of the rotating rotor and an out-of-track condition of the rotor blades,
   a. a pair of vibration pickups attached to said structure at locations at port and starboard sides of said axis to produce vibratory signals corresponding to up and down vibratory motion of the structure at said locations, and
   b. means for receiving and combining said signals to produce a resultant oscillatory output signal characteristic of rotor vibratory motion due substantially to only one of said conditions.

10. The combination of claim 9 wherein said last named means includes adding circuitry, subtracting circuitry, and switch means connected with said pickups and movable to selectively transmit said signals to said adding and said subtracting circuitry.

11. The combination of claim 10 including means connected to receive said resultant oscillatory output signal and to process same for determining the characteristic angularity of one of the blades about said axis once each cycle of said signal.

12. The combination of claim 11 wherein said last named means comprises a ring of indicators subject to successive energization in synchronism with rotor rotation, and timing means for gating the energization of only that indicator whose angular position relative to the ring most closely corresponds to the characteristic angularity of said one blade.

* * * * *